United States Patent
Sim et al.

(10) Patent No.: US 8,982,072 B2
(45) Date of Patent: Mar. 17, 2015

(54) MOBILE DEVICE AND METHOD OF CONTROLLING SCREEN THEREOF

(75) Inventors: Sang Hyun Sim, Gyunggi-do (KR); Ji Hoon Kim, Gyunggi-do (KR); Bo Yle Seo, Gyunggi-do (KR); Yoon Seok Oh, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 204 days.

(21) Appl. No.: 13/535,595

(22) Filed: Jun. 28, 2012

(65) Prior Publication Data

US 2013/0285933 A1 Oct. 31, 2013

(30) Foreign Application Priority Data

Apr. 26, 2012 (KR) ........................ 10-2012-0043983

(51) Int. Cl.
*G06F 3/041* (2006.01)

(52) U.S. Cl.
USPC .......................................................... 345/173

(58) Field of Classification Search
CPC .................. G06F 2203/04806; G06F 3/04883; H04M 2250/22
USPC .......................................................... 345/173
See application file for complete search history.

(56) References Cited

U.S. PATENT DOCUMENTS

| | | |
|---|---|---|
| 2006/0022955 A1 | 2/2006 | Kennedy |
| 2008/0094368 A1 | 4/2008 | Ording et al. |
| 2008/0211783 A1 | 9/2008 | Hotelling et al. |
| 2010/0097337 A1 | 4/2010 | Lin et al. |
| 2010/0141684 A1 | 6/2010 | Machida |
| 2010/0156806 A1* | 6/2010 | Stallings ........................ 345/173 |
| 2010/0315439 A1 | 12/2010 | Huang et al. |
| 2011/0078567 A1 | 3/2011 | Kim et al. |
| 2011/0109581 A1* | 5/2011 | Ozawa et al. .................. 345/173 |
| 2011/0193809 A1* | 8/2011 | Walley et al. .................. 345/173 |
| 2011/0249073 A1 | 10/2011 | Cranfill et al. |
| 2012/0071149 A1* | 3/2012 | Bandyopadhyay et al. .. 455/418 |

FOREIGN PATENT DOCUMENTS

| | | |
|---|---|---|
| EP | 2405335 A2 | 1/2012 |
| KR | 10-2010-0023637 | 3/2010 |
| KR | 10-2010-0124440 | 11/2010 |
| KR | 10-2011-0035724 | 4/2011 |
| WO | WO 2010/134704 A2 | 11/2010 |

OTHER PUBLICATIONS

German Office Action issued Jun. 24, 2013 in corresponding German Application No. 102012013368.5.
Korean Office Action mailed Nov. 22, 2013 in corresponding Korean Application No. 10-2012-0043983.
German Office Action issued Jan. 21, 2013 in corresponding German Patent Application No. 10 2012 013 368.5.

\* cited by examiner

*Primary Examiner* — Viet Pham

(57) ABSTRACT

There are provided a mobile device and a method of controlling a screen of the mobile device. The mobile device includes: a display unit including an effective display area for displaying a screen; a touch screen panel including a plurality of sensing electrodes; and a control unit detecting a touch input based on a sensing signal generated from the plurality of sensing electrodes and controlling the screen displayed by the display unit, wherein when the touch input corresponds to a previously set first input gesture, the control unit controls such that a size of the screen is reduced at a predetermined first ratio and the reduced screen is only displayed in a portion of the effective display area.

15 Claims, 7 Drawing Sheets

MOBILE DEVICE AND METHOD OF CONTROLLING SCREEN THEREOF

CROSS-REFERENCE TO RELATED APPLICATIONS

This application claims the priority of Korean Patent Application No. 10-2012-0043983 filed on Apr. 26, 2012, in the Korean Intellectual Property Office, the disclosure of which is incorporated herein by reference.

BACKGROUND OF THE INVENTION

1. Field of the Invention

The present invention relates to a mobile device providing an interface environment, which can be operated by a user using one hand and in which the user may provide a touch input that is input as a predetermined touch gesture to reduce a screen and display the reduced screen in only a portion of a display unit, and a method of controlling the screen of the mobile device.

2. Description of the Related Art

As mobile devices such as smartphones, tablet PCs, personal digital assistants (PDAs), and the like have come into widespread use, various methods have been suggested to increase user convenience in the use thereof. There is a tendency for mobile devices that are currently being developed and launched to include a large-sized screen in order to increase user convenience. By applying a large-sized display unit to a mobile device, viewer convenience in terms of watching videos or reading text may be increased, and currently, a large screen display unit is being applied not only to tablet PCs but also to smartphones.

Currently launched smartphones mostly provide a large screen of 4.5 inches or more, and some provide a screen of 5 inches or more. Although the provision of such a large screen may degrade portability, a large amount of text and images may be viewed on a single screen, and input via a touch screen becomes more convenient, and thus, the tendency for increased screen size in smartphones is expected to continue due to these strengths.

However, as the size of smartphone screens has gradually increased, not only portability of smartphones has been reduced, but operability thereof has decreased. That is, a mobile device having a screen of 4 inches or so may be operated by a user holding the mobile device with one hand and using only the thumb of the holding hand. However, as the screen size has increased to near 5 inches or even beyond 5 inches, a mobile device with such a screen cannot be operated using only one hand. Thus, in addition to a more convenient user interface using a large-sized screen, a method of executing any input using one hand needs to be provided according to circumstance.

Of the related art documents shown below, Patent Document 1 is related to a method of controlling a virtual keyboard device displayed on a display unit using a input gesture of a user, and Patent Document 2 is related to a method of expanding or reducing a predetermined portion of a screen displayed by a display unit according to a input gesture of a user.

RELATED ART DOCUMENT (Patent Document 1) Korean Patent Laid-Open Publication No. 10-2011-0035724
(Patent Document 2) U.S. Patent Application Publication No. 2008/0094368

SUMMARY OF THE INVENTION

An aspect of the present invention provides a mobile device including a display unit providing a large screen, wherein the entire screen can be reduced at a predetermined ratio according to a predetermined user input gesture and is only displayed in a predetermined portion of the display unit, and a touch input may be applied to the entire screen using just one hand regardless of screen size, and a method of controlling the screen of the mobile device.

According to an aspect of the present invention, there is provided a mobile device including: a display unit including an effective display area for displaying a screen; a touch screen panel including a plurality of sensing electrodes; and a control unit detecting a touch input based on a sensing signal generated from the plurality of sensing electrodes and controlling the screen displayed by the display unit, wherein when the touch input corresponds to a previously set first input gesture, the control unit controls such that a size of the screen is reduced at a predetermined first ratio and the reduced screen is only displayed in a portion of the effective display area.

The control unit may convert an operation of at least some of the sensing electrodes corresponding to a remaining area portion from except the portion of the effective display area in which the screen reduced at the first ratio is displayed, into a sleep mode.

The control unit may control the display unit such that when a touch input that is different from the first input gesture and corresponds to a previously set second input gesture is detected, a size of the screen is converted at a second ratio that is different from the first ratio and displayed.

The size of the screen converted at the second ratio may correspond to a size of an entire effective display area of the display unit.

The first input gesture and the second input gesture may include swipe gestures including unique directional information and unique length information.

The direction information of the first input gesture and the direction information of the second input gesture may be opposite to each other.

The first input gesture may include direction information corresponding to a clockwise direction, and the second input gesture may include direction information corresponding to a counter-clockwise direction.

The portion of the effective display area in which the screen reduced at the predetermined first ratio is displayed may correspond to an area in which a user may apply the touch input using one hand.

The control unit may determine a position of the portion of the effective display area in which the screen reduced at the predetermined first ratio is displayed and the first ratio based on at least one of direction information of the touch input corresponding to the first input gesture, coordinates of a point in which the touch input starts, and coordinates of a point in which the touch input ends.

According to another aspect of the present invention, there is provided a method of controlling a screen of a mobile device, the method including: sensing a touch input based on a sensing signal generated from a plurality of sensing electrodes; determining whether the touch input corresponds to a previously set first input gesture; and when the touch input corresponds to the first input gesture, controlling the display unit such that a size of a screen displayed on a display unit is reduced at a predetermined first ratio and is only displayed in a portion of an effective display area of the display unit.

In the controlling, the screen may be controlled to only be displayed in the portion of the effective display area in which a user applies the touch input using one hand.

The method may further include converting operations of a driving line and a data line of the display unit corresponding to a remaining area except the portion of the effective display area in which the screen reduced at the predetermined first ratio is displayed, into a sleep mode.

The method may further include converting an operation of some of the sensing electrodes corresponding to the remaining area except the portion of the effective display area in which the screen reduced at the predetermined first ratio is displayed, into a sleep mode.

A position of the portion of the effective display area in which the screen reduced at the predetermined first ratio is displayed and the first ratio may be determined, based on at least one of direction information of the touch input corresponding to the first input gesture, coordinates of a point at which the touch input starts, and coordinates of a point at which the touch input ends.

The method may further include, when a touch input corresponding to a second input gesture that is different from the first input gesture is sensed, converting a size of the screen at a second ratio that is different from the first ratio and displaying the screen.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
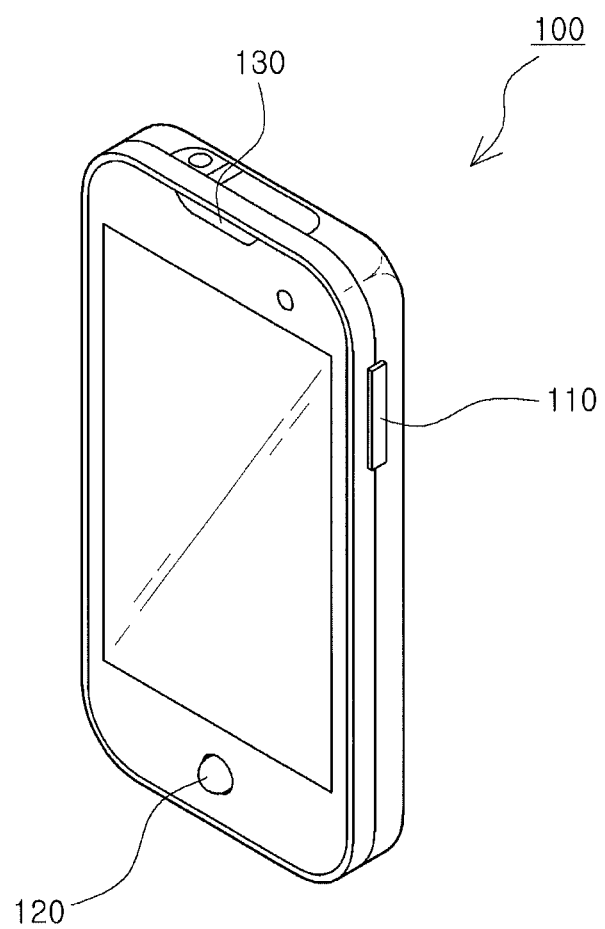
FIG. 1 is a perspective view illustrating the external appearance of a mobile device according an embodiment of the present invention.

Embodiments of the present invention will be described in detail with reference to the accompanying drawings. These embodiments will be described in detail for those skilled in the art in order to practice the present invention. It should be appreciated that various embodiments of the present invention are different but are not necessarily exclusive. For example, specific shapes, configurations, and characteristics described in an embodiment of the present invention may be implemented in another embodiment without departing from the spirit and the scope of the present invention. In addition, it should be understood that positions and arrangements of individual components in each disclosed embodiment may be changed without departing from the spirit and the scope of the present invention. Therefore, a detailed description described below should not be construed as being restrictive. In addition, the scope of the present invention is defined only by the accompanying claims and their equivalents when appropriate. Similar reference numerals will be used to describe the same or similar functions throughout the accompanying drawing.

Hereinafter, embodiments of the present invention will be described in detail with reference to the accompanying drawings so that those skilled in the art may easily practice the present invention.

FIG. 1 is a perspective view illustrating the external appearance of a mobile device 100 according an embodiment of the present invention.

Referring to FIG. 1, the mobile device 100 includes a display unit 110 outputting a screen, an input unit 120, and an audio output unit 130. The input unit 120 may be implemented as a mechanical button as illustrated in FIG. 1 or may be a touch screen device that is integrally provided with the display unit 110.

The display unit 110 is typically formed of a flat panel display, or may also be a liquid crystal display unit or an organic light emitting device. An operation of the display unit 110 is controlled by a control unit (not shown) included in the mobile device 100, and the control unit may control the display unit 110 to display a screen either in a horizontal mode or in a vertical mode according to necessity.

Referring to FIG. 1, the display unit 110 generally provides a tetragonal screen to a user, particularly, a rectangular screen in which a width and a length are not same. Hereinafter, the display unit 110 refers to a device displaying a screen itself, and the screen refers to any image such as a still image or a video image that is output on an effective display area of the display unit 110. That is, in general cases, the mobile device 100 outputs a screen on the effective display area of the display unit 110 according to executed applications.

Figure 2:
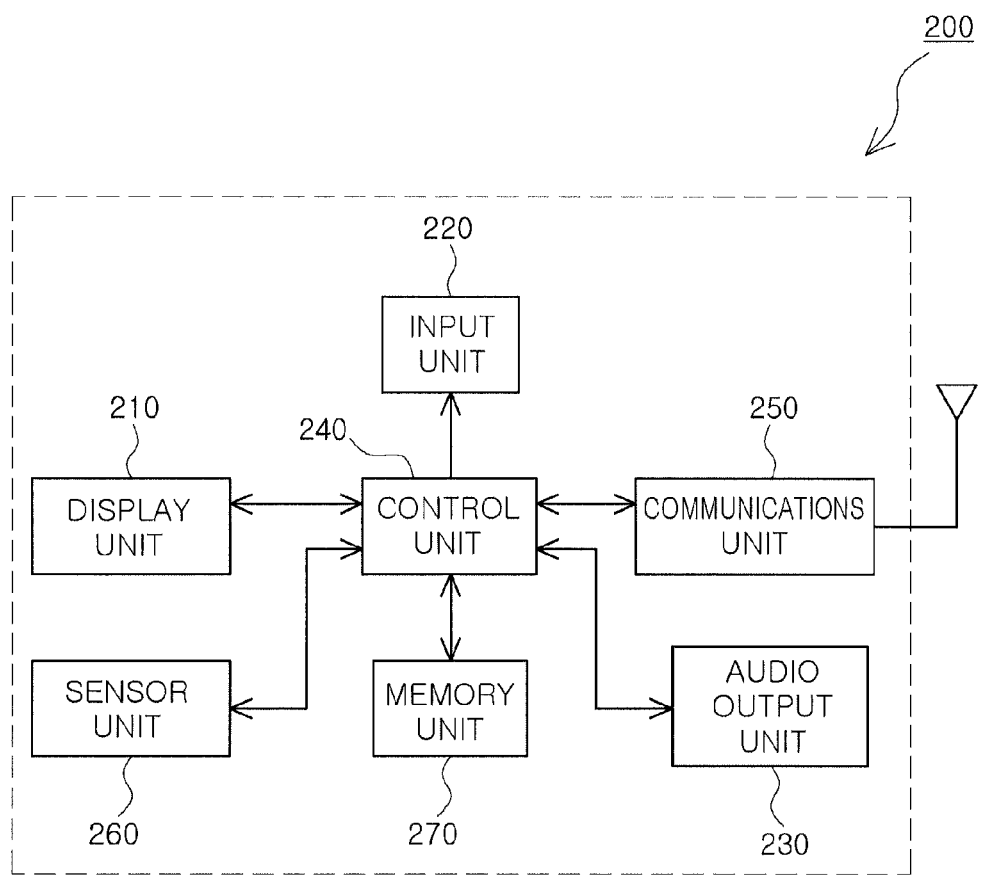
FIG. 2 is a schematic block diagram illustrating a mobile device according to an embodiment of the present invention.

FIG. 2 is a schematic block diagram illustrating a mobile device 200 according to an embodiment of the present invention.

Referring to FIG. 2, the mobile device 200 may include a display unit 210, an input unit 220, an audio output unit 230, a control unit 240, a communications unit 250, a sensor unit 260, and a memory unit 270. The structure and operation of the display unit 210 are similar to those of the display unit 110 of FIG. 1, and the control unit 240 may control operations of respective modules included in the mobile device 200.

As described above, the input unit 220 may include a mechanical button exposed on the external appearance of a housing of the mobile device 200 and a touch screen device that is integrally provided with the display unit 210. The control unit 240 may control an operation of the mobile device 200 based on various inputs transmitted via the input unit 220. The audio output unit 230 may be a module used to output music, voice audio, or the like to the outside.

The communications unit 250 is a module included in the mobile device 200 for wireless or wired communications, and may be, for example, a Bluetooth module, a Wi-Fi module, a geographic positioning system (GPS) module, a universal serial bus (USB) communications module, or the like. The control unit 240 may turn each communications module included in the communications unit 250 on or off and control an operation thereof according to user's selection or nearby communications environments. The memory unit 270 is a module capable of storing or outputting data, and the control unit 240 may manage data stored in the memory unit 270 and output required data via a user input or the like and use the same in operating the mobile device 200.

The sensor unit 260 may include, for example, a Gyro sensor sensing a direction of gravity working on the mobile device 200, a GPS sensor sensing a position, or the like. For example, the control unit 240 may perform various operations according to a gravitational direction sensed by using a Gyro sensor. For example, the control unit 240 may select whether to display a screen output by the display unit 210 in a horizontal mode or a vertical mode based on the gravitational direction sensed by using the Gyro sensor.

FIGS. 3 through 8 are views for explaining a method of operating a mobile device 300 according to an embodiment of the present invention.

Figure 3A:
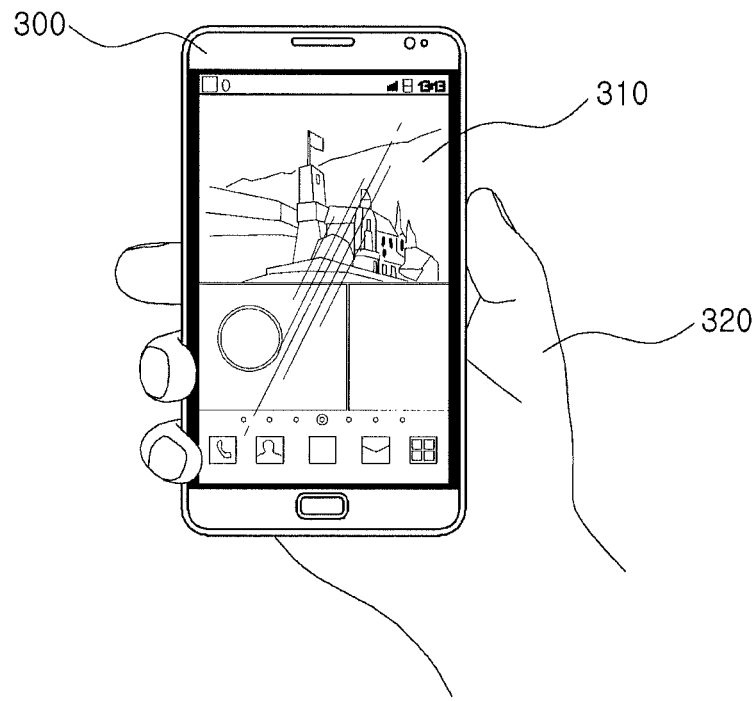
FIGS. 3 through 8 are views for explaining a method of operating a mobile device according to an embodiment of the present invention.
Figure 3B:
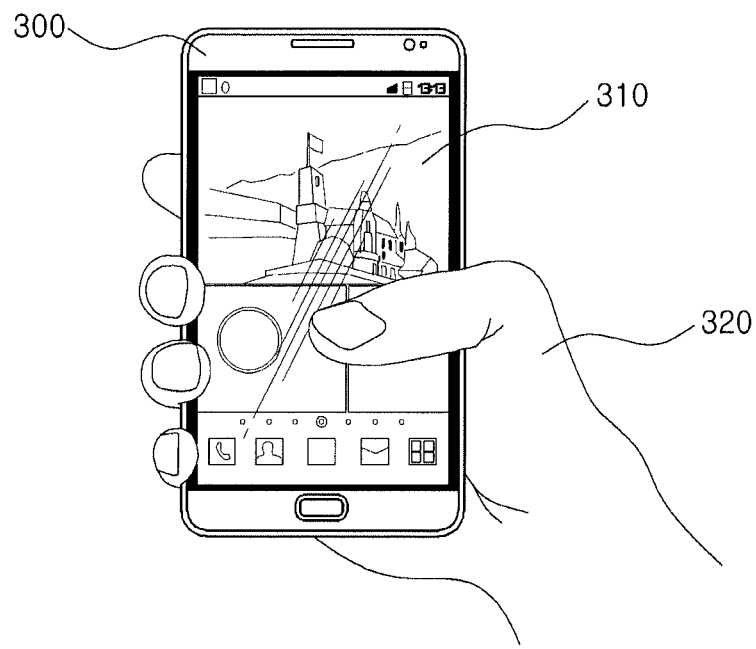

FIGS. 3A and 3B illustrate a user 320 operating a mobile device 300 using one hand. Hereinafter, for convenience of description, it is assumed that the entire effective display area of a display unit 310 is substantially the same as an effective input area of a touch screen device which is capable of sensing or detecting an effective touch input.

Accordingly, in order for the user 320 to use the mobile device 300 without difficulty, any icon displayed on a screen output by using the display unit 310 needs to be selected via a touch input. However, as illustrated in FIGS. 3A and 3B, when a size of a screen output by the display unit 310 increases to be near 5 inches or even beyond 5 inches, it may be difficult to touch all icons on a screen output by the display unit 310 using just one hand. In addition, even when the screen is not large, a child or a female user 320 who have relatively small hands may not easily use the mobile device 300 using just one hand.

Figure 4:
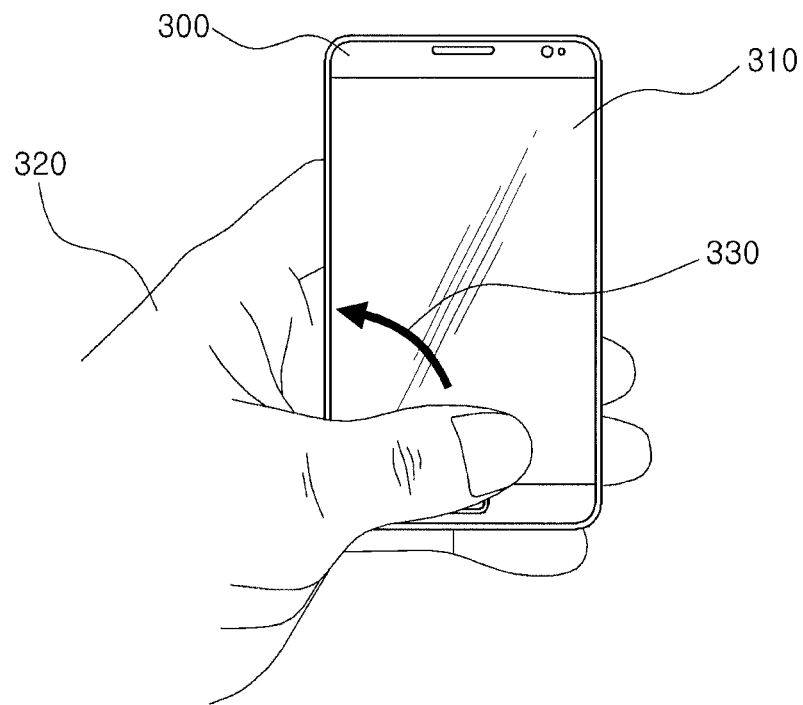

FIG. 4 illustrates a method of operating a mobile device 300 according to an embodiment of the present invention.

Referring to FIG. 4, it is assumed that a user 320 is using the mobile device 300 while holding the same with the left hand. The user 320 holds the mobile device 300 with the left hand and applies a touch input corresponding to a previously set first input gesture 330, to a screen with the thumb. According to the current embodiment of the present invention, a swipe operation of forming an arc in a counter-clockwise direction on a lower portion of a screen output by a display unit 310 is defined as the first input gesture 330. A touch screen device that is integrally provided with the display unit 310 senses a touch input of the user 320 and determines whether the touch input corresponds to the first input gesture 330.

Here, operations of sensing the touch input and comparing the touch input with the first input gesture 330 by the user 320 may be performed using a touch controller integrated circuit (IC) included in the touch screen device or by using a control unit of the mobile device 300. Alternatively, the mobile device 300 may be operated in such a manner that a touch input of the user 320 may be sensed via the touch controller IC, and the control unit may compare the sensed touch input with the first input gesture 330.

When it is determined that the touch input applied by the user 320 corresponds to the first input gesture 330, the control unit of the mobile device 300 reduces a screen output by the display unit 310 at a predetermined first ratio and displays the reduced screen. Here, the screen reduced at the first ratio may be only displayed in a limited portion of the display unit 310. This will be described below with reference to FIG. 5.

Figure 5:
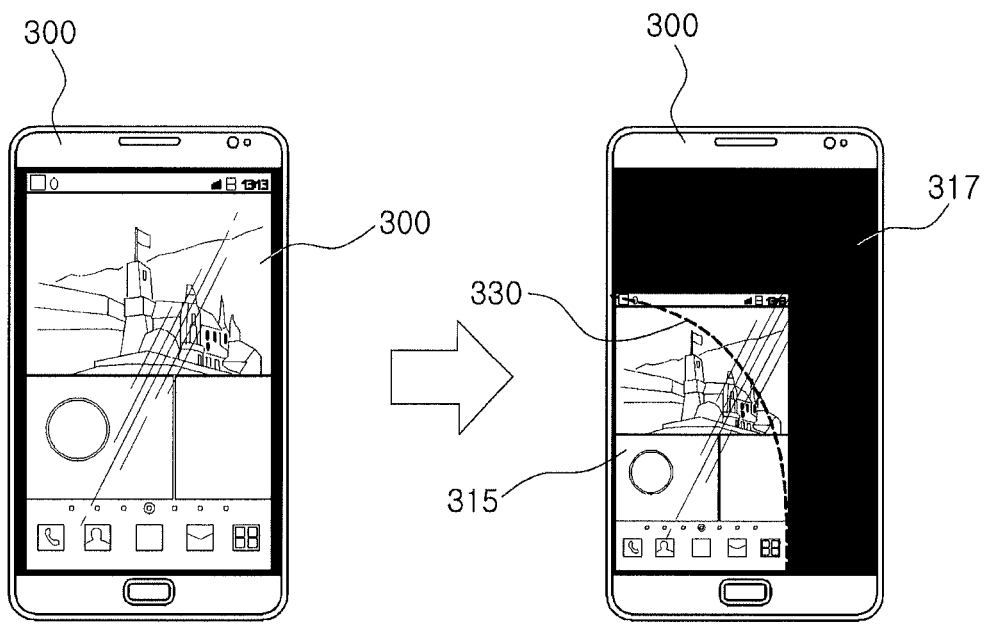

A left view of FIG. 5 illustrates the mobile device 300 in a normal operational state. The display unit 310 of the mobile device 300 outputs a first screen 313 over the entire effective display area. Then, when a touch input corresponding to the first input gesture 330 as illustrated in FIG. 4 is applied by the user 320, the first screen 313 output by the display unit 310 is converted into a screen as illustrated in a right view of FIG. 5.

Referring to the right view of FIG. 5, a second screen 315 is output as only a portion of the entire effective display area of the display unit 310. When comparing the second screen 315 with the first screen 313, contents thereof are the same but sizes thereof are different. That is, as a touch input corresponding to the first input gesture 330 is applied by the user 320, the second screen 315 that is obtained by reducing the first screen 313 which has been output on the entire effective display area, at a first ratio, is output on a portion of the display unit 310. Here, a remaining area 317 of the display unit 310 in which the second screen 315 is not output may be maintained in a sleep mode or an operation thereof may be selectively stopped in order to significantly reduce power consumption.

When a touch input corresponding to the first input gesture 330 is applied so that the first screen 313 is converted into the second screen 315, and the second screen 315 is displayed, the user 320 may apply a touch input to the second screen 315 using only the left thumb while holding the mobile device 300 with the left hand. Accordingly, pixels of the display unit 310 corresponding to the remaining area 317 that does not perform operations such as screen output or sensing of a touch input, and an electrode of a touch screen device, may be stopped from operating or may be maintained in a sleep mode. According to the above-described operation, an environment in which operation may be conveniently performed using one hand may be provided, and moreover, power consumption may be reduced.

Figure 6:
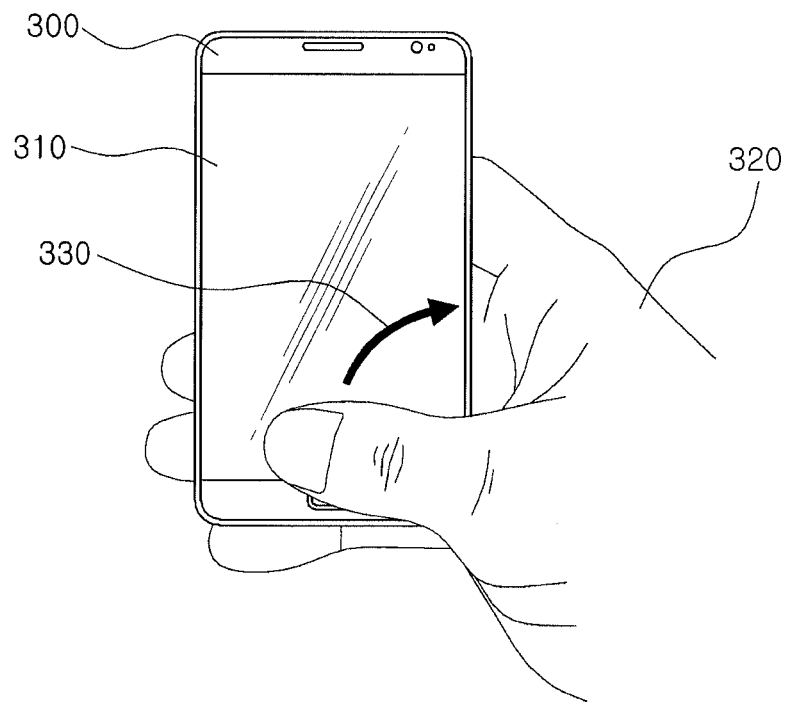

Next, referring to FIG. 6, it is assumed that the user 320 uses the mobile device 300 by holding the same with the right hand. The user 320 holds the mobile device 300 with the right hand and applies a touch input corresponding to a previously set first input gesture 330, to a screen with the thumb. As illustrated in FIG. 4, forming an arc in a counter-clockwise direction on a lower portion of the screen output by the display unit 310 is defined as the first input gesture 330. A touch screen device that is integrally provided with the display unit 310 senses a touch input of the user 320 and determines whether the touch input corresponds to the first input gesture 330.

When it is determined that a touch input applied by the user 320 corresponds to the first input gesture 330, the control unit of the mobile device 300 reduces the screen output by the display unit 310 at a predetermined first ratio and displays the reduced screen. The screen that is reduced at the first ratio may be only displayed in a limited portion of the display unit 310. Hereinafter, the reduced screen will be described with reference to FIG. 7.

Figure 7:
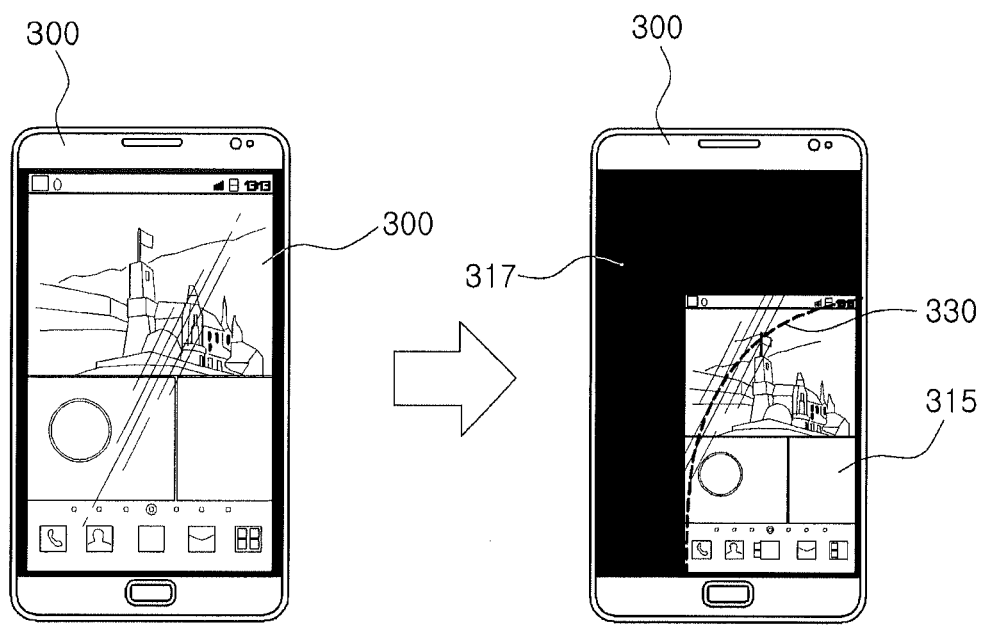

The left view of FIG. 7 also illustrates the mobile device 300 in a normal operational state like FIG. 5. The display unit 310 of the mobile device 300 outputs the first screen 313 over the entire effective display area. Then, when a touch input corresponding to the first input gesture 330 illustrated in FIG. 6 is applied by the user 320, the first screen 313 output by the display unit 310 is converted as illustrated in the right view of FIG. 7.

Referring to the right view of FIG. 7, a second screen 315 is output only on a portion of the entire effective display area of the display unit 310 like in FIG. 5. That is, as a touch input corresponding to the first input gesture 330 is applied by the user 320, the second screen 315 which is formed by reducing the first screen 313 output over the entire effective display area, at the first ratio, is output on a portion of the display unit 310. Here, a remaining area 317 of the display unit 310 in which the second screen 315 is not output may be maintained in a sleep mode or an operation thereof may be selectively stopped in order to significantly reduce power consumption.

Meanwhile, when comparing the right views of FIGS. 5 and 7, the first screen 313 is commonly reduced to the second screen 315 and displayed, but directions of the first input gestures 330 are different. That is, in FIG. 5, the first input gesture 330 is input counter-clockwise, and in FIG. 7, the first input gesture 330 is input clockwise. When the user 320 forms an arc by starting a touch input from a lower portion of the display unit 310, the control unit of the mobile device 300 may determine this arc form as the first input gesture 330.

Meanwhile, an area in which the second screen 315 reduced at the first ratio by using the display unit 310 is displayed may also be determined by the first input gesture 330. Referring to the right views of FIGS. 5 and 7, the second screen 315 is displayed in a rectangular area including a touch input starting point and a touch input end point of the arc-shaped first input gesture 330 as vertexes of the rectangular area. According to the current embodiment, the first input gesture 330 corresponds to an arc that may be formed by the thumb while the user 320 is holding the mobile device 300 with one hand. Accordingly, by displaying the second screen 315 within a range not deviating from the first input gesture 330, an environment in which the user 320 may apply a touch input to any area in the second screen 315 may be provided.

Figure 8:
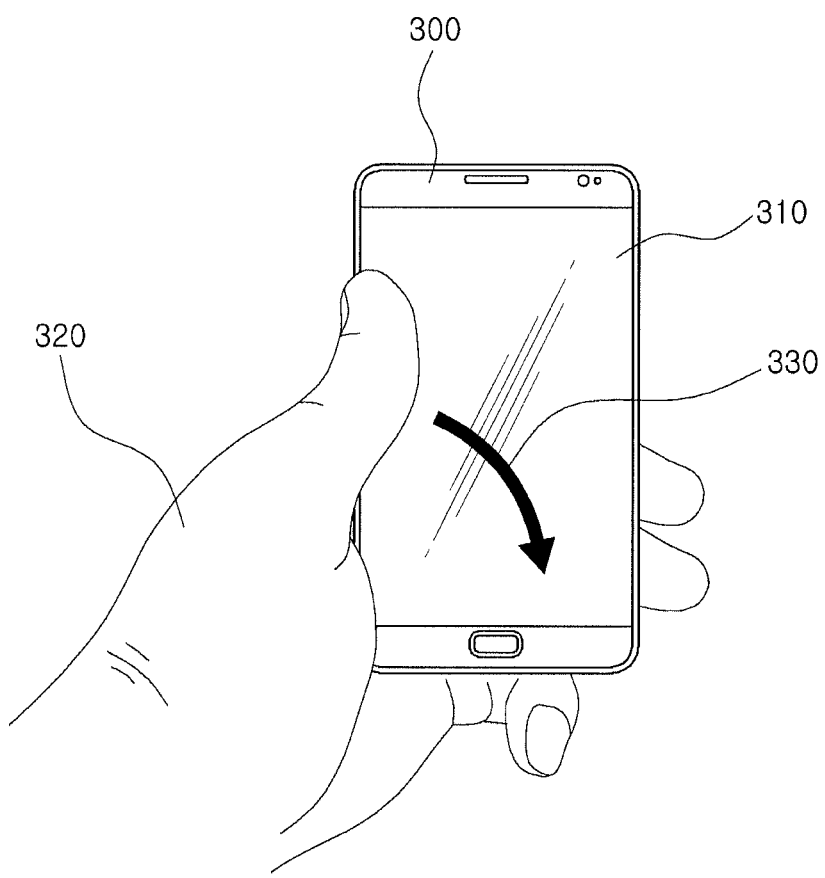

FIG. 8 is a schematic view for explaining an operation of restoring the second screen 315, which has been reduced at the first ratio and displayed, to the first screen 313 by converting the same at the second ratio. Referring to FIG. 8, while the user 320 is holding the mobile device 300 with one hand, the user 320 inputs a second input gesture 340 that is opposite to the first input gesture 330, using the thumb. That is, unlike the first input gesture 330, the second input gesture 340 proceeds in a direction from an upper portion to a lower portion of a screen of the display unit 310.

Alternatively, the second input gesture 340 having a clockwise direction unlike the first input gesture 330 of a counter-clockwise direction as illustrated in FIG. 4 may be defined. That is, in an environment in which the mobile device 300 is used with the left hand, when a swipe gesture that is in a counter-clockwise direction and follows an arc form is input, it is determined that the first input gesture 330 for reducing a screen and displaying the same is input; and when a swipe gesture of a clockwise direction is input, it may be determined that the second input gesture 340 for restoring the screen having been reduced and displayed, to the original screen is input. On the other hand, when using the mobile device 300 with the right hand, a swipe gesture in the counter-clockwise direction may be determined as the second input gesture 340, and a swipe gesture in the clockwise direction may be determined as the first input gesture 330.

According to the current embodiment of the present invention, the second ratio may be a ratio for restoring the second screen 315 to the first screen 313, or a ratio for converting the second screen 315 to a different screen size from the first screen 313. That is, while the first screen 313 is displayed on the display unit 310, when a touch input corresponding to the first input gesture 330 is applied, the second screen 315 is displayed; while the second screen 315 is displayed, when a touch input corresponding to the second input gesture 340 is applied, a third screen that is different from the first screen 313 or the second screen 315 may be displayed.

Figure 9:
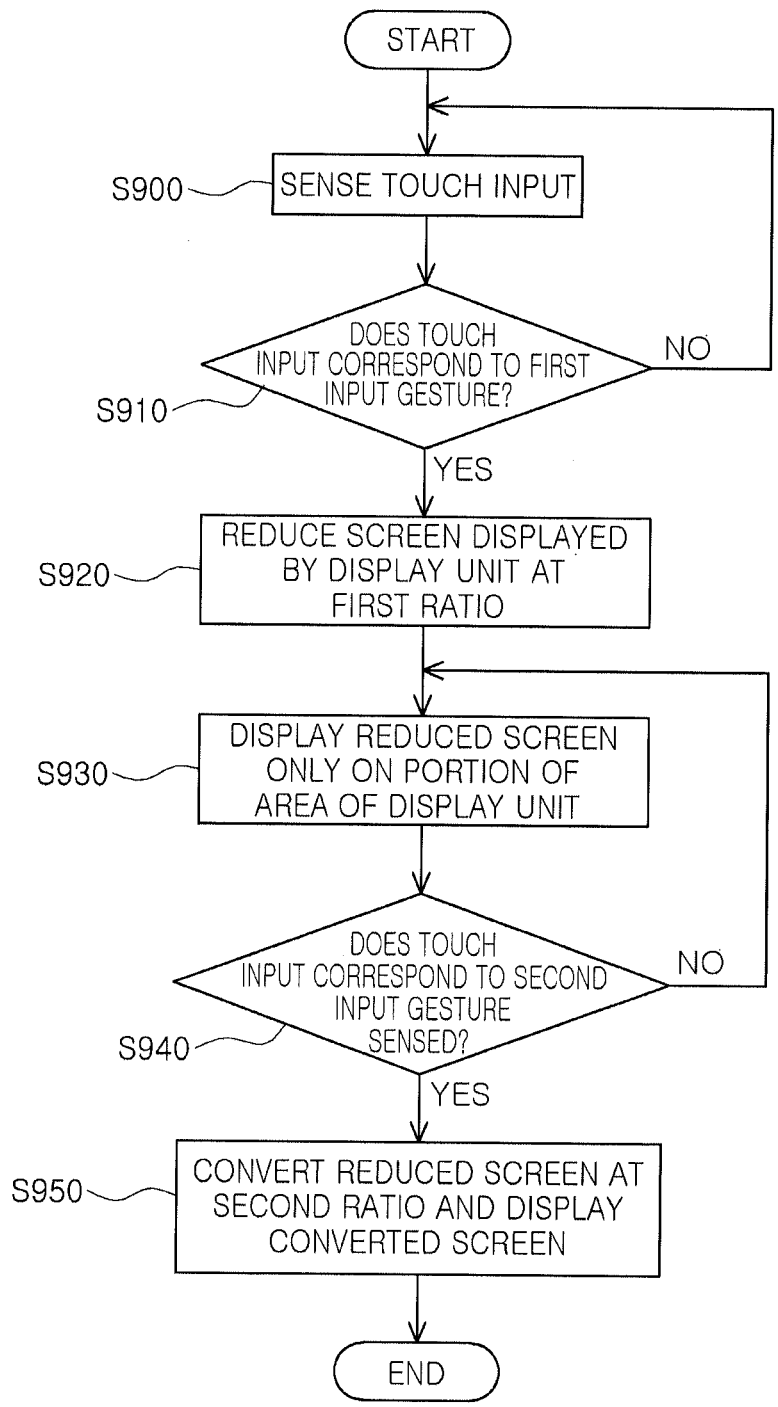
FIG. 9 is a flowchart illustrating a method of controlling a screen of a mobile device according to an embodiment of the present invention.

FIG. 9 is a flowchart illustrating a method of controlling a screen of a mobile device according to an embodiment of the present invention.

Referring to FIG. 9, according to the method of controlling a screen of a mobile device 300, in operation 5900, the mobile device 300 senses a touch input. The touch input may be sensed via, for example, a touch screen panel that is integrally provided with a display unit 310, and the controller, a touch controller IC connected to the touch screen panel, or the like determines whether the touch input sensed in operation 5900 corresponds to an input of the first input gesture 330 in operation S910.

When the sensed touch input is determined as corresponding to the input of the first input gesture 330, the control unit reduces a screen displayed by the display unit 310 at a first ratio in operation S920, and displays the reduced screen only in a portion of the display unit 310. When the touch input corresponding to the input of the first input gesture 330 is sensed, the second screen 315 formed by reducing the first screen 313 displayed over the entire effective display area of the display unit 310 at the first ratio is only displayed in a portion of the display unit 310, as illustrated in FIGS. 5 and 7.

Here, as described above, pixels of the display unit 310 and a sensing electrode of a touch screen panel, corresponding to the remaining area 317 in which the second screen 315 is not displayed, may be stopped from operating or may be converted into a sleep mode. Also, a portion of the display device in which the second screen 315 reduced at the first ratio is displayed may be determined by a starting point and an end point of a touch input corresponding to the first input gesture 330.

While the second screen 315 reduced at the first ratio is displayed, touch operations with respect to each icon of the reduced screen and objects are to be processed normally, and the control unit determines whether a touch input corresponding to an input of the second input gesture 340 is sensed, in operation S940. While a touch input corresponding to the input of the second input gesture 340 is not sensed in operation S940, the control unit continuously outputs the second screen 315.

On the other hand, when a touch input corresponding to an input of the second input gesture 340 is sensed in operation S940, the control unit converts the second screen 315 at a second ratio and displays the converted second screen 315 in operation 5950. The second ratio may have a value for restoring the second screen 315 to the first screen 313 again. Alternatively, the second ratio may be set to have a value for outputting a third screen that is different from the second screen 315 and the first screen 313.

As set forth above, according to the embodiments of the present invention, when a touch input of a user corresponds to a previously set input gesture, the entire screen displayed by a display unit is reduced at a predetermined ratio and the reduced screen is only displayed in a portion of an effective display area of the display unit. Accordingly, a method in which a user may apply a touch input to the entire screen using one hand according to the user's selection may be implemented in a mobile device including a large-sized screen which is difficult to operate using one hand, and user convenience of the mobile device may be increased.

While the present invention has been shown and described in connection with the embodiments, it will be apparent to those skilled in the art that modifications and variations can be made without departing from the spirit and scope of the invention as defined by the appended claims.

What is claimed is:

1. A mobile device comprising:
   a display unit including an effective display area for displaying a screen;
   a touch screen panel including a plurality of sensing electrodes; and
   a control unit detecting a touch input based on a sensing signal generated from the plurality of sensing electrodes and controlling the screen displayed by the display unit,
   when the touch input corresponds to a previously set first input gesture, the control unit controls reduction of a size of the screen, which is displayed, at a predetermined first ratio and the reduced size of the screen is only displayed in a portion of the effective display area,
   the control unit determines a position of the portion of the effective display area in which the reduced size of the screen, which is displayed, at the predetermined first ratio, and the predetermined first ratio is based on at least two of direction information of the touch input corresponding to the first input gesture, coordinates of a point at which the touch input starts, and coordinates of a point at which the touch input ends.

2. The mobile device of claim 1, wherein the control unit converts an operation of at least some of the sensing electrodes corresponding to a remaining area portion except the portion in which the reduced size of the screen at the first ratio is displayed, into a sleep mode.

3. The mobile device of claim 1, wherein the control unit controls such that when a touch input that is different from the first input gesture and corresponds to a previously set second input gesture is detected, a size of the screen is converted at a second ratio that is different from the first ratio and displayed.

4. The mobile device of claim 3, wherein the size of the screen converted at the second ratio corresponds to a size of an entire effective display area of the display unit.

5. The mobile device of claim 3, wherein the first input gesture and the second input gesture include swipe gestures including unique directional information and unique length information.

6. The mobile device of claim 5, wherein the direction information of the first input gesture and the direction information of the second input gesture are opposite to each other.

7. The mobile device of claim 6, wherein the first input gesture includes direction information corresponding to one of a clockwise direction and a counter-clockwise direction.

8. The mobile device of claim 1, wherein the portion of the effective display area in which the reduced size of the screen at the predetermined first ratio corresponds to an area in which a user may apply the touch input using one hand.

9. A method of controlling a screen of a mobile device, the method comprising:
sensing a touch input based on a sensing signal generated from a plurality of sensing electrodes;
determining whether the touch input corresponds to a previously set first input gesture;
when the touch input corresponds to the first input gesture, the display unit controls reduction of a size of a screen displayed on a display unit at a predetermined first ratio and the reduced size of the screen is only displayed in a portion of an effective display area of the display unit; and
determining a position of the portion of the effective display area in which the reduced size of the screen displayed on the display unit at the predetermined first ratio and determining the predetermined first ratio are determined based on at least two of direction information of the touch input corresponding to the first input gesture, coordinates of a point at which the touch input starts, and coordinates of a point at which the touch input ends.

10. The method of claim 9, wherein in the controlling, the screen is controlled to only be displayed in the portion of the effective display area in which a user applies the touch input using one hand.

11. The method of claim 9, further comprising converting operations of a driving line and a data line of the display unit corresponding to a remaining area except the portion of the display unit in which the reduced size of the screen displayed on the display unit at the predetermined first ratio is displayed, into a sleep mode.

12. The method of claim 9, further comprising converting an operation of some of the sensing electrodes corresponding to the remaining area except the portion of the effective display area in which the reduced size of the screen displayed on the display unit at the predetermined first ratio is displayed, into a sleep mode.

13. The method of claim 9, further comprising, when a touch input corresponding to a second input gesture that is different from the first input gesture is sensed, converting a size of the screen at a second ratio that is different from the first ratio and displaying the screen.

14. The mobile device of claim 1,
wherein the predetermined first ratio is based on at least the coordinates of the point at which the touch input starts, which corresponds with a lower center portion of the screen, and the coordinates of the point at which the touch input ends, which corresponds with a position above the point at which the touch input starts and that is one of: right of the point at which the touch input starts and left of the point at which the touch input starts, and
wherein the touch input is a swipe gesture that forms an arc between the point at which the touch input starts and the point at which the touch input ends.

15. The mobile device of claim 1, wherein the predetermined first ratio is determined based on coordinates of the first touch input gesture being at a lower edge of the display unit.

* * * * *